United States Patent
Xing et al.

(10) Patent No.: US 10,460,688 B2
(45) Date of Patent: Oct. 29, 2019

(54) LIQUID CRYSTAL DISPLAY PANEL AND DISPLAY DEVICE HAVING LIQUID CRYSTAL DISPLAY PANEL

(71) Applicant: Wuhan China Star Optoelectronics Technology Co., Ltd., Wuhan, Hubei (CN)

(72) Inventors: Zhenzhou Xing, Guangdong (CN); Chun-hung Huang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 370 days.

(21) Appl. No.: 15/326,547

(22) PCT Filed: Nov. 18, 2016

(86) PCT No.: PCT/CN2016/106409
§ 371 (c)(1),
(2) Date: Jan. 16, 2017

(87) PCT Pub. No.: WO2018/176420
PCT Pub. Date: May 3, 2018

(65) Prior Publication Data
US 2018/0211622 A1 Jul. 26, 2018

(51) Int. Cl.
*G09G 3/36* (2006.01)
*G06F 3/038* (2013.01)
(Continued)

(52) U.S. Cl.
CPC ....... *G09G 3/3677* (2013.01); *G02F 1/13338* (2013.01); *G02F 1/136286* (2013.01);
(Continued)

(58) Field of Classification Search
CPC ...... G06F 3/0412; G06F 3/044; G06F 3/0416; G09G 3/3648; G09G 3/3614
See application file for complete search history.

(56) References Cited

U.S. PATENT DOCUMENTS 9,134,581 B2    9/2015  Yang
2007/0030233 A1*  2/2007  Chai ................... G09G 3/3648
                                              345/98

(Continued)

FOREIGN PATENT DOCUMENTS

CN   102707524 A   10/2012
CN   103714751 A    4/2014
(Continued)

OTHER PUBLICATIONS

CN2016109282996_1ST Office Action.

*Primary Examiner* — Nan-Ying Yang
(74) *Attorney, Agent, or Firm* — Andrew C. Cheng

(57) ABSTRACT

The liquid crystal display panel comprises: data line pairs, comprising a first data line and a second data line located side by side; scan lines, comprising a first scan line and a second scan line which are perpendicular with the data line pairs and alternatively arranged; a pixel unit array, comprising pixel units, respectively located in regions formed by arrangement of the data line pairs and the scan lines; wherein a scan drive signal received by the first and second scan lines scan the two rows of pixel units coupled to each other at the same time, and the first and second scan lines are respectively coupled to at least two pixel units in a single row of the pixel units, and drives the pixel units coupled to each data line in time division to charge the pixel units coupled to the same data line in time division.

13 Claims, 4 Drawing Sheets

(51) Int. Cl.
*G09G 5/00* (2006.01)
*G02F 1/1333* (2006.01)
*G06F 3/041* (2006.01)
*G02F 1/1362* (2006.01)

(52) U.S. Cl.
CPC ......... *G06F 3/0412* (2013.01); *G09G 3/3614* (2013.01); *G09G 3/3688* (2013.01); *G09G 2300/0452* (2013.01); *G09G 2310/0205* (2013.01); *G09G 2310/0291* (2013.01); *G09G 2310/0297* (2013.01)

(56) References Cited

U.S. PATENT DOCUMENTS

| | | | |
|---|---|---|---|
| 2009/0179875 A1* | 7/2009 | Li | G09G 3/3648 345/204 |
| 2010/0238100 A1 | 9/2010 | Chen et al. | |
| 2014/0184580 A1* | 7/2014 | Cho | G09G 3/3614 345/212 |
| 2016/0014401 A1* | 1/2016 | Son | H04N 13/356 345/694 |
| 2016/0259475 A1* | 9/2016 | Nakamura | G06F 3/0416 |

FOREIGN PATENT DOCUMENTS

| | | |
|---|---|---|
| CN | 104464601 A | 3/2015 |
| CN | 104699355 A | 6/2015 |
| CN | 104849890 A | 8/2015 |
| CN | 105761659 A | 7/2016 |
| JP | 2011008190 A | 1/2011 |
| TW | 201020666 A | 6/2010 |

\* cited by examiner

LIQUID CRYSTAL DISPLAY PANEL AND DISPLAY DEVICE HAVING LIQUID CRYSTAL DISPLAY PANEL

CROSS REFERENCE

This application claims the priority of Chinese Patent Application No. 201610928299.6, entitled "Liquid crystal display panel and display device having liquid crystal display panel", filed on Oct. 31, 2016, the disclosure of which is incorporated herein by reference in its entirety.

FIELD OF THE INVENTION

The present invention relates to a display technology field, and more particularly to a liquid crystal display panel and a display device having a liquid crystal display panel.

BACKGROUND OF THE INVENTION

With the consciousness increase of the power saving and the environment protecting of the people, the requirements of power saving and light volume are taken more and more seriously by the cell phone makers and the end consumers. Particularly, power saving has already become the big sell point of the cell phone. At present, the main stream power saving technology is the RGBW four primary colors display technology, which mainly promote the transmission rate of the panel by increasing the white pixels, and uses the sub pixel sharing algorithm. It can decrease ⅓ of pixel amounts for the panel under the premise of unchanged resolution, and thus reduces the production yield risk of the ultrahigh resolution panels, and reduces the backlight power consumption up to 40%, and can promote the result of the high image contrast, and then becomes the main stream power saving technology.

Most of the present liquid crystal display panels having RGBW four primary colors+in-cell touch panel employ 2 to 8 De-mux (demultiplexer) drive structure. As shown in FIG. 1, the structure possesses benefits of reducing power consumption in comparison with the simple 1 to 4 De-mux drive structure in the condition of common column inversion. As shown in FIG. 2, FIG. 2 is a display sequence of the RGBW four primary colors+In-cell touch panel according to prior art. The sequence can be divided into a plurality of Display terms and TP terms. Namely, in the display terms, the liquid crystal display panel is in a charge display status, and in the TP terms, the liquid crystal display panel performs touch control scan. However, as the liquid crystal display panel having the RGBW four primary colors+In-cell touch panel employs 2 to 8 De-mux drive structure, the duration of TP term in one frame is set to be 4.5 ms for ensuring the touch control scan accuracy. Thus, the width of each De-mux width is merely about 0.80 us. Under the influences of the present LTPS manufacture process and the carrier mobility, the panel might has the risk of insufficient charge. The present invention provides a liquid crystal display panel and a display device having the liquid crystal display panel, which can promote the pixel charge duration of the liquid crystal display panel having the RGBW four primary colors+In-cell touch panel.

SUMMARY OF THE INVENTION

Aiming at the problems existing in the prior art, the embodiment of the present invention provides a liquid crystal display panel and a display device having the liquid crystal display panel which can charge two rows of pixel units at the same time to double the charge duration of the pixels for providing sufficient charge duration for each pixel. Even the in-cell touch module is integrated, the charge duration will not be shorten due to the touch control scan and the charge result of the pixel unit will not be influenced, and thus the display result can be more stable.

In one respect, the present invention provides a liquid crystal display panel, and the liquid crystal display panel comprises:

a plurality of data line pairs, each set of data line pair comprising a first data line and a second data line which are located side by side;

a plurality of scan lines, comprising a first scan line and a second scan line which are perpendicular with the plurality of data line pairs and alternatively arranged;

a pixel unit array, comprising a plurality of pixel units, which are respectively located in regions formed by arrangement of the plurality of data line pairs and the plurality of scan lines, and each row of pixel units being coupled to a first scan line and a second scan line;

wherein a scan drive signal received by the first scan line and the second scan line scan the two rows of pixel units coupled to each other at the same time, and the first scan line and the second scan line are respectively coupled to at least two pixel units in a single row of the pixel unit, and drives the pixel units coupled to each data line in time division to charge the pixel units coupled to the same data line in time division.

The first scan line and the second scan line are separated with a row of pixel units, and each of the first scan lines is arranged to be adjacent to one of the second scan lines.

The first scan line and the second scan line are separated with k rows of pixel units, and k of the first scan lines are adjacent, and k of the second scan lines are adjacent, and $2 \leq k \leq n/2$ is satisfied, wherein n is a row number of the pixel unit array, and k and n are positive integers, and n is a positive integer larger than or equal to 4.

The pixel unit array is formed with the pixel units of red (R), green (G), blue (B), white (W), four colors repeatedly aligned along a row direction, and each row of pixel units employs the same manner to be circularly aligned, or alignments of all rows of pixel units are not exactly the same.

Pixel alignments in every two adjacent rows of pixel units in the pixel unit array are different, and one row of pixel units employs a RGBW manner to be circularly aligned and the other row of pixel units employs a manner different from the RGBW manner to be circularly aligned.

The first data line and the second data line transmit data signals with positive polarity or negative polarity to the coupled pixel units, and the polarities of the entire column of the pixel unit array are inverted, and the pixel units are coupled to the first data line or the second data line which can provide corresponding polarity signals according to self polarities to make the first data line or the second data line be coupled to a plurality of pixel units of the same row at the same time.

In the pixel unit, the polarities of the pixels of the entire column are reversed in order of positive, negative, negative, positive, negative, positive, positive, negative.

In another aspect, the present invention provides a liquid crystal display device, comprising:

a liquid crystal display panel, comprising:

a plurality of data line pairs, each set of data line pair comprising a first data line and a second data line which are located side by side;

a plurality of scan lines, comprising a first scan line and a second scan line which are perpendicular with the plurality of data line pairs and alternatively arranged; and a pixel unit array, comprising a plurality of pixel units, which are respectively located in regions formed by arrangement of the plurality of data line pairs and the plurality of scan lines, and each row of pixel units being coupled to a first scan line and a second scan line;

a scan drive unit, employed to provide a scan drive signal to the first scan line and the second scan line; and a data drive unit, employed to provide a data drive signal to a first data line and a second data line;

wherein a scan drive signal received by the first scan line and the second scan line scan the two rows of pixel units coupled to each other at the same time, and the first scan line and the second scan line are respectively coupled to at least two pixel units in a single row of the pixel unit, and drives the pixel units coupled to each data line in time division to charge the pixel units coupled to the same data line in time division.

wherein the liquid crystal display device further comprises:

a touch control module, embedded inside the liquid crystal display panel; and a sequence control unit, electrically coupled to the scan drive unit and the data drive unit, and employed to control the liquid crystal display panel realizing touch control function in a touch panel term and to control the display panel showing images in a display term.

The first scan line and the second scan line are separated with a row of pixel units, and each of the first scan lines is arranged to be adjacent to one of the second scan lines.

The first scan line and the second scan line are separated with k rows of pixel units, and k of the first scan lines are adjacent, and k of the second scan lines are adjacent, and 2≤k≤n/2 is satisfied, wherein n is a row number of the pixel unit array, and k and n are positive integers, and n is a positive integer larger than or equal to 4.

The pixel unit array is formed with the pixel units of red (R), green (G), blue (B), white (W), four colors repeatedly aligned along a row direction, and each row of pixel units employs the same manner to be circularly aligned, or alignments of all rows of pixel units are not exactly the same.

Pixel alignments in every two adjacent rows of pixel units in the pixel unit array are different, and one row of pixel units employs a RGBW manner to be circularly aligned and the other row of pixel units employs a manner different from the RGBW manner to be circularly aligned.

The first data line and the second data line transmit data signals with positive polarity or negative polarity to the coupled pixel units, and the polarities of the entire column of the pixel unit array are inverted, and the pixel units are coupled to the first data line or the second data line which can provide corresponding polarity signals according to self polarities to make the first data line or the second data line be coupled to a plurality of pixel units of the same row at the same time.

In the pixel unit, the polarities of the pixels of the entire column are reversed in order of positive, negative, negative, positive, negative, positive, positive, negative.

The liquid crystal display panel and the display device having the liquid crystal display panel of the present invention provided in the embodiment of the present invention can charge two rows of pixel units at the same time to double the charge duration of the pixels for providing sufficient charge duration for each pixel. Even the in-cell touch module is integrated, the charge duration will not be shorten due to the touch control scan and the charge result of the pixel unit will not be influenced, and thus the display result can be more stable.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments. It is clear that the described embodiments are part of embodiments of the present application, but not all embodiments. Based on the embodiments of the present invention, all other embodiments to those of ordinary skill in the premise of no creative efforts obtained, should be considered within the scope of protection of the present invention.

In the description of the invention, which needs explanation is that the term "installation", "connected", "connection" should be broadly understood unless those are clearly defined and limited, otherwise, For example, those can be a fixed connection, a detachable connection, or an integral connection; those can be a mechanical connection, or an electrical connection; those can be a direct connection, or an indirect connection with an intermediary, which may be an internal connection of two elements. To those of ordinary skill in the art, the specific meaning of the above terminology in the present invention can be understood in the specific circumstances.

Besides, in the description of the present invention, unless with being indicated otherwise, "plurality" means two or more. In the present specification, the term "process" encompasses an independent process, as well as a process that cannot be clearly distinguished from another process but yet achieves the expected effect of the process of interest.

Moreover, in the present specification, any numerical range expressed herein using "to" refers to a range including the numerical values before and after "to" as the minimum and maximum values, respectively. In figures, the same reference numbers will be used to refer to the same or like parts.

The present invention provides a liquid crystal display panel and a display device having the liquid crystal display panel, which can charge two rows of pixel units at the same time to double the charge duration of the pixels for providing sufficient charge duration for each pixel. Even the in-cell touch module is integrated, the charge duration will no longer be shorten due to the touch control scan and the charge result of the pixel unit will not be influenced, and the display result can be more stable. The detail descriptions are respectively introduced below.

Figure 1:
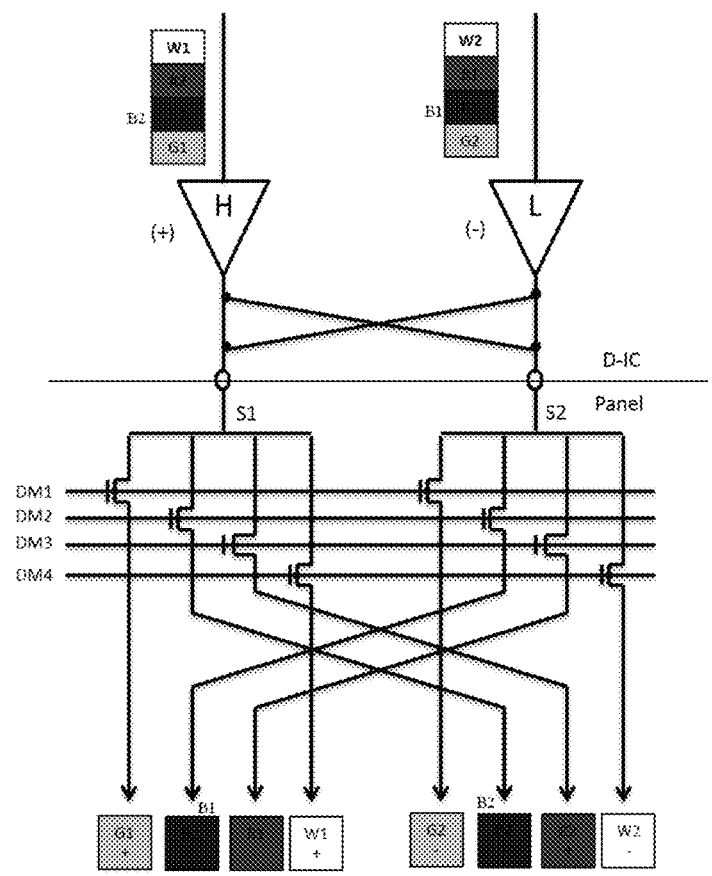
FIG. 1 is a 2 to 8 De-mux driving diagram of a liquid crystal display panel having RGBW four primary colors in prior art.
Figure 2:
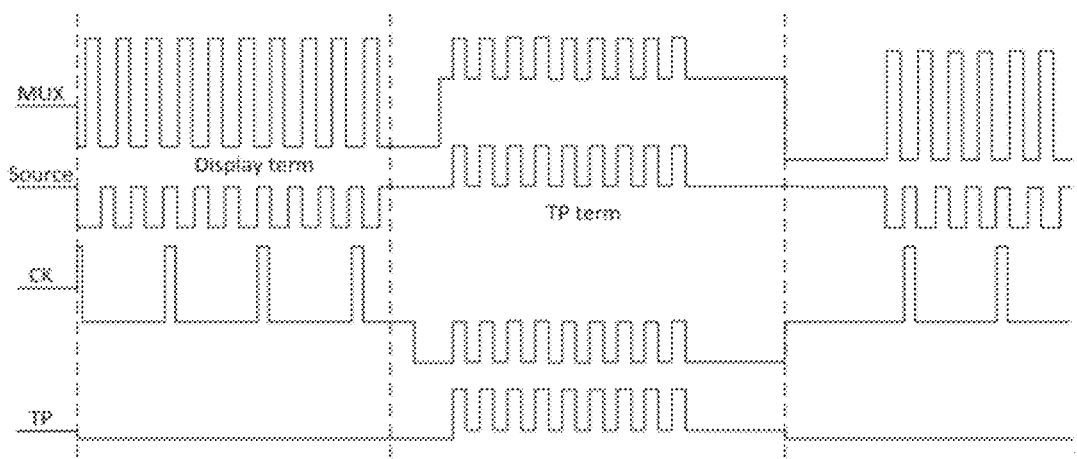
FIG. 2 is a sequence diagram of a liquid crystal display panel having RGBW four primary colors+In-cell touch panel in prior art.
Figure 3:
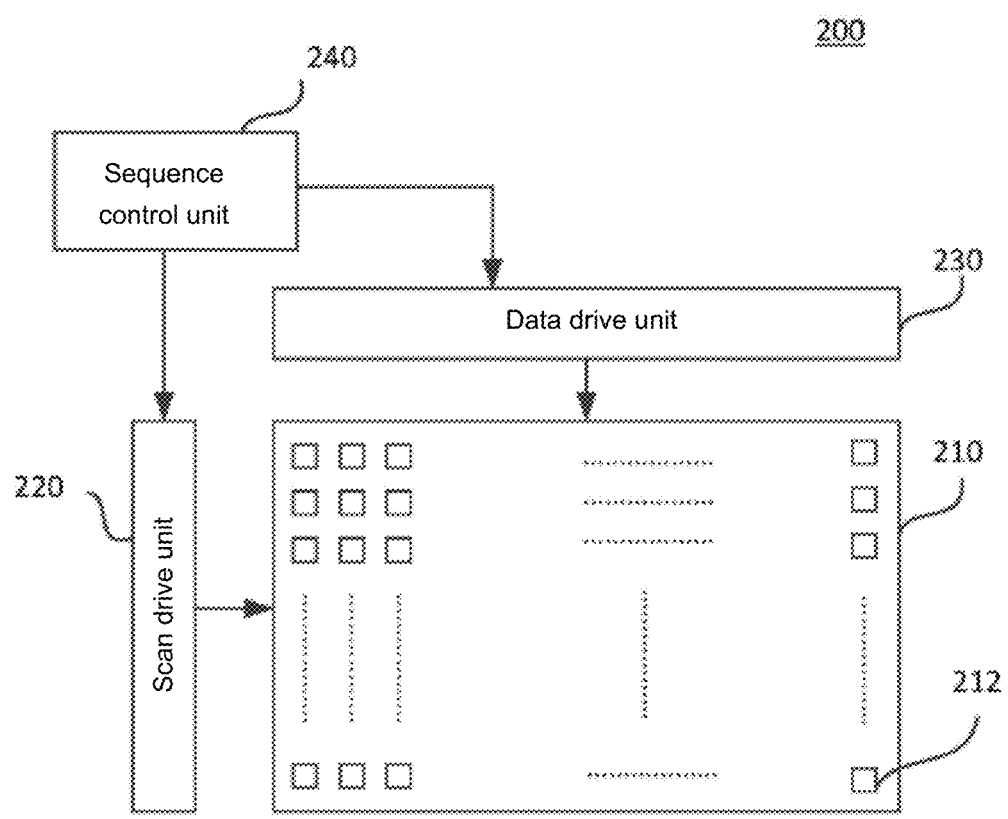
FIG. 3 is a structural diagram of a liquid crystal display device according to the embodiment of the present invention.

Please refer to FIG. 3. FIG. 3 is a structural diagram of a liquid crystal display device 200 according to the embodiment of the present invention. The liquid crystal display device 200 comprises a liquid crystal display panel 210 (a display panel in short), a touch control module (not shown), a scan drive unit 220, a data drive unit 230 and a sequence control unit 240, wherein the touch control module is embedded inside the liquid crystal display panel 210, and the liquid crystal display panel 210 comprises a plurality of pixel units 212 arranged in an array form.

The scan drive unit 220 and the data drive unit 230 are respectively coupled to the liquid crystal display panel 210. In the embodiment of the present invention, the liquid crystal display panel 210 is a display panel integrating the touch control function with in-cell manner, which realizes image display in the preset set Display term, and realizes touch control operation in the preset touch TP term. Specifically, the sequence control unit 240 is electrically coupled to the scan drive unit 220 and the data drive unit 230, and controls the scan drive unit 220 to scan the display panel 210 in the display term, and controls the data drive unit 230 to drive the display panel 210 to realize image display. In the preset TP term, the scan drive unit 220 and the data drive unit 230 are controlled to perform touch control scan to the panel to realize the touch control operation.

The liquid crystal display panel 210 of the present invention comprises a plurality of data line pairs, a plurality of scan lines and a pixel unit array, and the pixel unit array is formed with the pixel units of red, green, blue, white, four colors repeatedly aligned along a row direction. Please refer to FIG. 4. In the first embodiment of the present invention, a display panel having a 4*8 pixel unit array, two data line pairs, four scan lines is illustrated for explanation, wherein each data line pair comprises two data lines.

Figure 4:
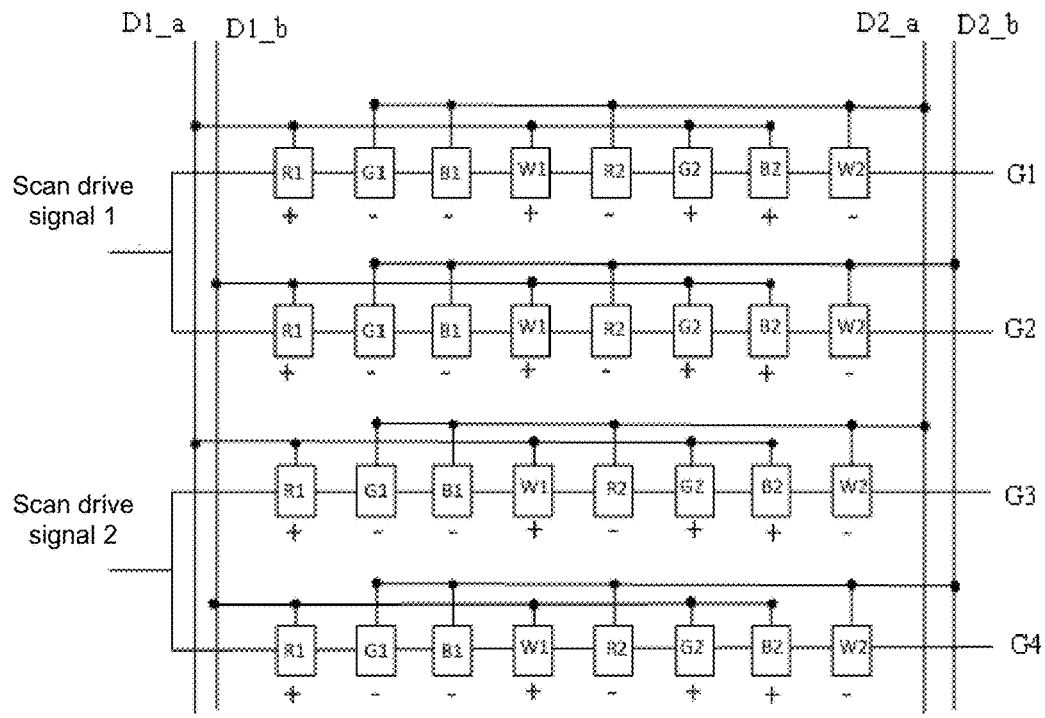
FIG. 4 is a structure diagram of a liquid crystal display panel according to the first embodiment of the present invention.

In this embodiment, each set of data line pair comprises a first data line and a second data line which are located side by side. In FIG. 4, the data lines D1_a and D1_b construct a data line pair. Similarly, the data lines D2_a and D2_b construct a data line pair, wherein the first data line is D1_a and D2_a, and the second data line is D1_b and D2_b. Besides, the data lines (including the first data line and the second data line) can transmit data signals with positive polarity or negative polarity to the coupled pixel units, and the polarities of the pixel units in the pixel unit array can be inverted in a specific manner, such as dot inversion, column inversion, row inversion or frame inversion. In the present invention, the pixel unit array employs the improved column inversion to invert the polarities of the pixel units. When a plurality of data line pairs are arranged on the display panel 210 side by side, such as D3_a, D3_b, D2_a, D4_b, D5_a and D5_b . . . , the first data lines are D1_a, D2_a, D3_a, D4_a, D5_a . . . , and the second data lines are D1_b, D2_b, D3_b, D4_b, D5_b . . . .

FIG. 4 further comprises a plurality of scan lines (G1 to G4). Specifically, the plurality of scan lines (G1 to G4) comprises a first scan line and a second scan line which are perpendicular with the plurality of data line pairs and alternatively arranged, and the first scan line and the second scan line are adjacent, and the two are separated with one row of pixel units inbetween. In FIG. 4, the first scan lines are G1, G3, and the second scan lines are G2, G4. The first scan line G1 and the second scan line G2 are adjacent, and one row of pixel units is separated inbetween. If the display panel 210 comprises more scan lines, the scan lines of odd rows G5, G7, G9 . . . are categorized to be the first scan lines, and the scan lines of even rows G6, G8, G10 . . . are categorized to be the second scan lines.

The pixel unit array comprises a plurality of pixel units, and the pixel units of each row are formed by employing the same arrangement manner for being circularly aligned. In this embodiment, in the 4*8 pixel unit array, each row has two pixel units of R, G, B, W, primary colors, and the pixel units of each row employs the circular alignment in RGBW order. Namely, in this embodiment, the alignment manner of the 8 pixel units of each row is R1G1B1W1R2G2B2W2 as shown in FIG. 4.

In the display panel 210, the plurality of pixel units in each row are respectively coupled to the same scan line, i.e. the first scan line or the second scan line through a TFT switch (not shown); the plurality of pixel units in each column are respectively coupled to the first data line or the second data line through the aforesaid TFT switch. Specifically, which of the first data line and the second data line the single column of the pixel unit is coupled to is determined according to the polarity inversion manner in the pixel unit array and the polarities of the data signals provided by the respective data lines. For instance, D1_a, D1_b in this embodiment can provide a data signal of positive polarity, and D2_a, D2_b can provide a data signal of negative polarity, and the polarity of the pixel unit array in this embodiment is realized by employing the improved column inversion, i.e. the polarities of the pixel units R1G1B1W1R2G2B2W2 of 8 columns respectively are positive+, negative−, negative−, positive+, negative−, positive+, positive+, negative−. Therefore, the pixel units R1W1G2B2 of positive polarity are coupled to the data line D1_a or D1_b, and the pixel units G1B1R2W2 of negative polarity are coupled to the data line D2_a or D2_b. It can be understood that as one data line is coupled with a plurality of pixel units, the pixel units of corresponding terms are driven with the time division manner.

For convenience, in this embodiment, the pixel units coupled to the first scan line or the first data line through the (TFT switch) are defined to be the first pixel units, and the pixel units coupled to the second scan line or the second data line through the (TFT switch) are defined to be the second pixel units. In FIG. 4, the pixel units of the entire row are the first pixel units, or the pixel units of the entire row are the second pixel units, and the first pixel units of one row and the second pixel units of one row are alternatively arranged in order, and the first pixel units and the second pixel units in each column corresponding thereto are alternatively arranged, too. The first column of the pixel units is illustrated. The first pixel unit R1 (i.e. R1 of the first row in FIG. 4) is coupled to the first data line D1_a and the first scan line G1, and the first pixel unit G1 (i.e. G1 of the first row in FIG. 4) is coupled to the second data line D2_a and the first scan line G1; the second pixel unit R1 (i.e. R1 of the second row in FIG. 4) is coupled to the second data line D1_*b* and the second scan line G2, and the second pixel unit B1 (i.e. B1 of the first row in FIG. 4) is coupled to the second data line D2_*b* and the second scan line G2.

In the setting display term (i.e. the display process), the scan drive unit 220 provides a scan drive signal to the first scan line and the second scan line, and the data drive unit 230 provides a data drive signal to the first data line and the second data line. Because both each of the first scan lines and the second scan lines is coupled with a plurality of pixel units in the same row of the pixel units, the data drive unit 230 charges the pixel electrodes of the plurality of pixel units of each row in the time division manner under control of the sequence control unit 240.

Specifically, in this embodiment, the scan lines G1, G2 are respectively coupled to the first row of the pixel units and the second row of the pixel units, and can scan the pixel units of the first row and the second row at the same time according to the scan drive signal 1, and the data lines D1_*a*, D1_*b*, D2_*a*, D2_*b* charge the pixel electrodes of the pixel units of the first row and the second row according to the data drive signal in time division. Similarly, the scan lines G3, G4 can scan the pixel units of the third row and the fourth row at the same time according to the scan drive signal 2, and the data lines charge the pixel electrodes of the pixel units of the third row and the fourth row in time division. Accordingly, both the charge durations of the pixel units of the first row and the second row and the charge durations of the pixel units of the third row and the fourth row can reach twice of the present charge duration and effectively extend the charge duration of the pixel electrodes.

In the touch panel term (i.e. in the touch control process), the working principle of the display panel 210 is the same as that of the in-cell touch panel of prior art, and no detail description is not conducted here.

The liquid crystal display panel 210 and the display device 200 according to the embodiment of the present invention can realize the touch control operation in the touch panel term, and can charge two rows of the pixels at the same time to double the charge duration of the pixels for providing sufficient charge duration for each pixel. The charge duration will no longer be shortened due to the touch control scan and the charge result of the pixel unit will not be influenced, and the display result can be more stable.

Figure 5:
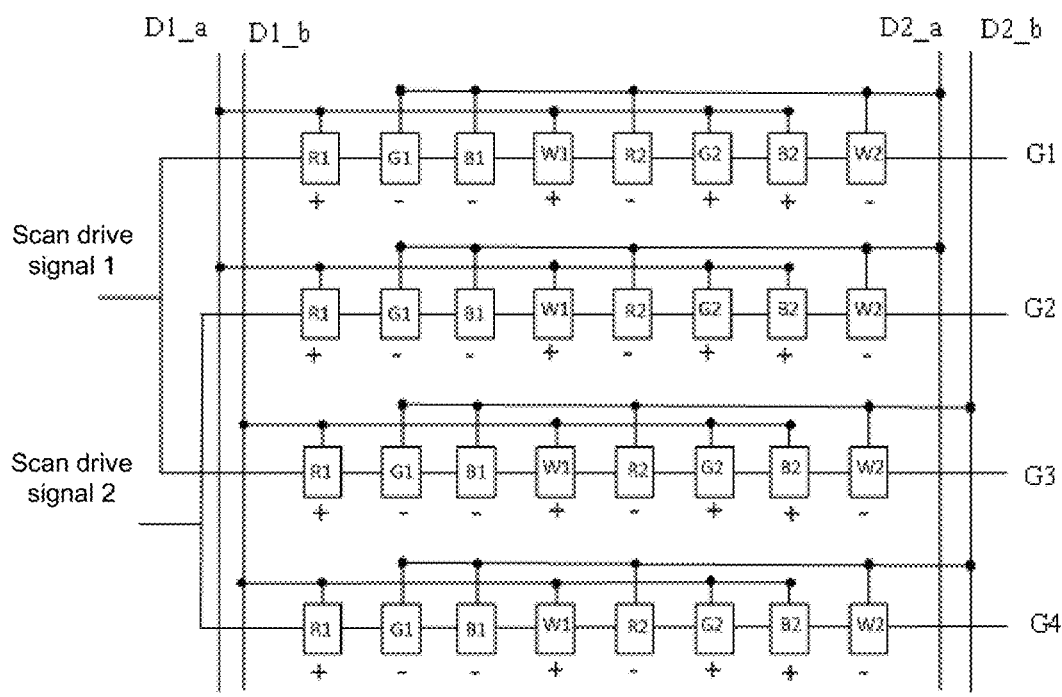
FIG. 5 is a structure diagram of a liquid crystal display panel according to the second embodiment of the present invention.

Please refer to FIG. 5, which is a structure diagram of a liquid crystal display panel of the second embodiment of the present invention. The data line in the display panel and the arrangement manner of the pixel unit array in the embodiment are the same as these of the first embodiment, and the repeated description is omitted. The difference between the two is: the arrangement of the scan lines of the second embodiment is different from that of the first embodiment. The first scan line and the second scan line in the second embodiment are separated with two rows of pixel units inbetween, and two first scan lines are adjacent, and two second scan lines are adjacent. In FIG. 5, the first scan lines are G1, G2 which are adjacent, and the second scan lines are G3, G4 which are adjacent.

For convenience, in this embodiment, two first pixel units, which are continuously arranged in each column are defined to be a first pixel unit set. Similarly, two second pixel units, which are continuously arranged in each column are defined to be a second pixel unit set. The pixel units of the first column are illustrated. The pixel unit R1 of the first row and the pixel unit R1 of the second row construct the first pixel unit set, and the pixel unit R1 of the third row and the pixel unit R1 of the fourth row construct the second pixel unit set. Thus, in the first column, the first pixel unit set and the second pixel unit set are alternately aligned. The first pixel unit set and the second pixel unit set are alternately coupled to the first data line and the second line. As shown in FIG. 5, two rows of the pixel units of the first pixel unit set (i.e. pixel units of the first row and the pixel units of the second row) are coupled to the first data lines D1_*a*, D2_*a*, and two rows of the pixel units of the second pixel unit set (i.e. pixel units of the third row and the pixel units of the fourth row) are coupled to the first data lines D1_*b*, D2_*b*.

In FIG. 5, as in the display term, the scan lines G1 and G3 are respectively coupled to the pixel units of the first row and the third row, and can scan the pixel units of the first row and the third row at the same time according to the scan drive signal 1, and the data lines D1_*a*, D1_*b*, D2_*a*, D2_*b* charge the pixel electrodes of the pixel units of the first row and the third row according to the data drive signal in time division. Similarly, the scan lines G2, G4 can scan the pixel units of the second row and the fourth row at the same time, and the data lines charge the pixel electrodes of the pixel units of the second row and the fourth row according to the data drive signal in time division. Accordingly, both the charge durations of the pixel units of the first row and the third row and the charge durations of the pixel units of the second row and the fourth row can reach twice of the present charge duration and greatly extend the charge duration of the pixel electrodes.

In the touch panel term (i.e. in the touch control process), the working principle of the display panel 210 is the same as that of the in-cell touch panel of prior art, and no detail description is not conducted here.

As aforementioned, the first pixel unit sets and the second pixel unit sets in each column of pixel units are alternatively arranged in order, and alternately charge the pixel electrodes of the first pixel unit sets and the second pixel unit sets in each column through the first data line and the second data line in the display process.

It can be understood that three rows or four rows of pixel units can be located to separate the first scan line and the second scan line. For instance, if the first scan line and the second scan line are separated with k rows of pixel units, and 2≤k≤n/2 is satisfied, wherein n is a row number of the pixel unit array, and k and n are positive integers, and n is a positive integer larger than or equal to 4. The first pixel unit sets and the second pixel unit sets in each column of pixel units are alternatively arranged in order, and the first pixel unit set comprises k first pixel units which are adjacent, and the second pixel unit set comprises k second pixel units which are adjacent.

Figure 6:
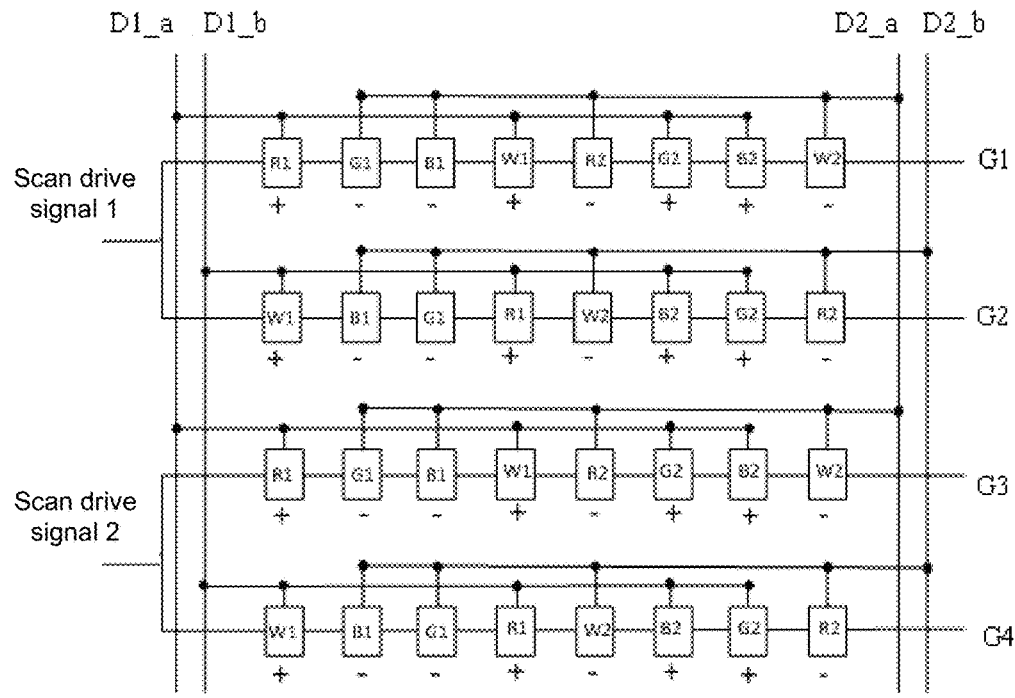
FIG. 6 is a structure diagram of a liquid crystal display panel according to the third embodiment of the present invention.

Please refer to FIG. 6, which is a structure diagram of a liquid crystal display panel of the third embodiment of the present invention. The display panel of the embodiment is roughly the same as the display panel of the first embodiment, and the difference is: the pixel arrangement manners in the pixel unit array are different. All the arrangement manners of the pixel units of each row in the first embodiment are the same, and the arrangement manners of the pixel units of each row in the third embodiment are not exactly the same. Specifically, in this embodiment, in every two rows of the pixel units which are adjacent, the arrangement manner of one row of the pixel units is the same as that of the first embodiment which employs a RGBW manner to be circularly aligned and the other row of pixel units employs a manner different from the RGBW manner but can employ a WBGR manner to be circularly aligned. Namely, the 8 pixel units of the row can be W1B1G1R1W2B2G2R2. The arrangement of the data lines, scan lines of the display panel of the embodiment are the same as these in the second embodiment, and the working principle are the same. The detail description is not repeated here. The repeated description related to the display device having the liquid crystal display panel of the embodiment is omitted, too.

It can be understood that the adjacent rows of pixel units in the embodiment can respectively employ the different arrangement manner for alignment, and alternatively, one row in the adjacent rows of pixel units or the rows of pixel units, which are adjacent or separated, can employ the different arrangement manner for alignment.

Figure 7:
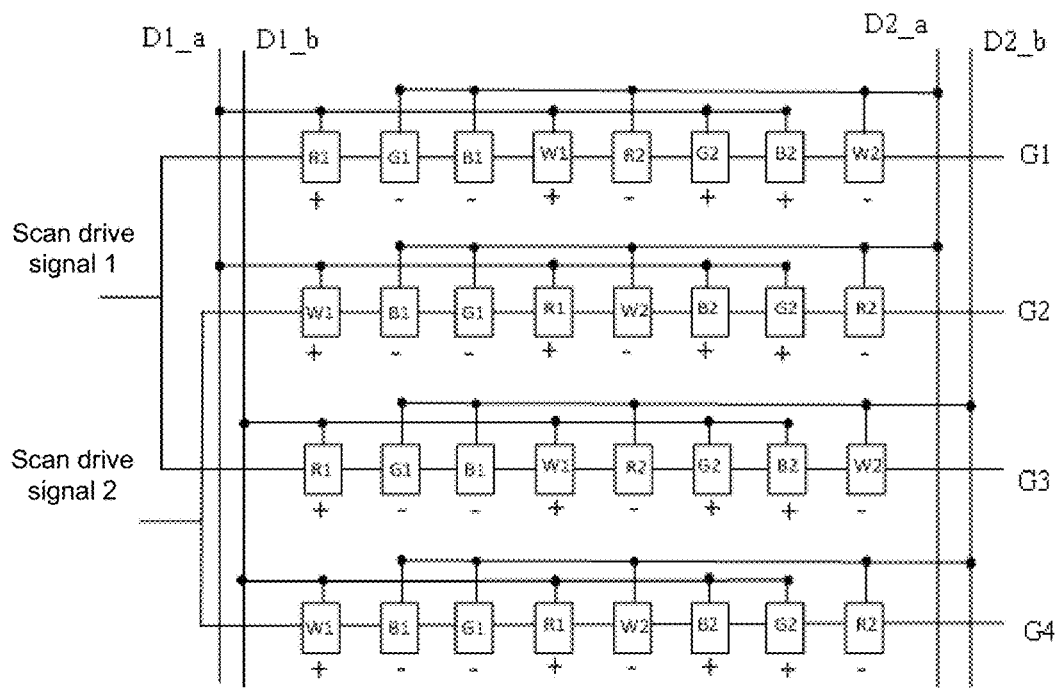
FIG. 7 is a structure diagram of a liquid crystal display panel according to the fourth embodiment of the present invention.

Please refer to FIG. 7, which is a structure diagram of a liquid crystal display panel of the fourth embodiment of the present invention. The display panel of the embodiment is roughly the same as the display panel of the first embodiment, and the difference is: the pixel arrangement manners in the pixel unit array are different. All the arrangement manners of the pixel units of each row in the first embodiment are the same, and the arrangement manners of the pixel units of each row in the fourth embodiment are not exactly the same. Specifically, in this embodiment, in every two rows of the pixel units which are adjacent, the arrangement manner of one row of the pixel units is the same as that of the second embodiment which employs a RGBW manner to be circularly aligned and the other row of pixel units employs a manner different from the RGBW manner but can employ a WBGR manner to be circularly aligned. Namely, the 8 pixel units of the row are W1B1G1R1W2B2G2R2. The arrangement of the data lines, scan lines of the display panel of the embodiment are the same as these in the second embodiment, and the working principle are the same. The detail description is not repeated here. The repeated description related to the display device having the liquid crystal display panel of the embodiment is omitted, too.

It can be understood that the adjacent rows of pixel units in the embodiment can respectively employ the different arrangement manner for alignment, and alternatively, one row in the adjacent rows of pixel units or the rows of pixel units, which are adjacent or separated, can employ the different arrangement manner for alignment.

The liquid crystal display panel and the display device having the liquid crystal display panel, which can charge two rows of pixel units at the same time to double the charge duration of the pixels for providing sufficient charge duration for each pixel. Even the touch module is embedded, the charge duration will no longer be shorten due to the touch control scan and the charge result of the pixel unit will not be influenced, and the display result can be more stable.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

The detail description has been introduced above for the liquid crystal display panel and the display device having the liquid crystal display panel, which are provided by the embodiment of the invention. Herein, a specific case is applied in this article for explain the principles and specific embodiments of the present invention have been set forth. The description of the aforesaid embodiments is only used to help understand the method of the present invention and the core idea thereof; meanwhile, for those of ordinary skill in the art, according to the idea of the present invention, there should be changes either in the specific embodiments and applications but in sum, the contents of the specification should not be limitation to the present invention.

What is claimed is:

1. A liquid crystal display panel, wherein the liquid crystal display panel comprises:
    a plurality of data line pairs, each set of data line pair comprising a first data line and a second data line which are located side by side;
    a plurality of scan lines, comprising a first scan line and a second scan line which are perpendicular with the plurality of data line pairs and alternatively arranged;
    a pixel unit array, comprising a plurality of pixel units, which are respectively located in regions formed by arrangement of the plurality of data line pairs and the plurality of scan lines, and each row of pixel units being coupled to a first scan line and a second scan line;
    wherein a scan drive signal received by the first scan line and the second scan line scan the two rows of pixel units coupled to each other at the same time, and the first scan line and the second scan line are respectively coupled to at least two pixel units in a single row of the pixel unit, and drives the pixel units coupled to each data line in time division to charge the pixel units coupled to the same data line in time division;
    wherein the first data line and the second data line transmit data signals with positive polarity or negative polarity to the coupled pixel units, and the polarities of the entire column of the pixel unit array are inverted, and the pixel units are coupled to the first data line or the second data line which can provide corresponding polarity signals according to self polarities to make the first data line or the second data line be coupled to a plurality of pixel units of the same row at the same time
    wherein in the pixel unit, the polarities of the pixels of the entire column are reversed in order of positive, negative, negative, positive, negative, positive, positive, negative.

2. The liquid crystal display panel according to claim 1, wherein the first scan line and the second scan line are separated with a row of pixel units, and each of the first scan lines is arranged to be adjacent to one of the second scan lines.

3. The liquid crystal display panel according to claim 1, wherein the first scan line and the second scan line are separated with k rows of pixel units, and k of the first scan lines are adjacent, and k of the second scan lines are adjacent, and 2≤k≤n/2 is satisfied, wherein n is a row number of the pixel unit array, and k and n are positive integers, and n is a positive integer larger than or equal to 4.

4. The liquid crystal display panel according to claim 1, wherein the pixel unit array is formed with the pixel units of red (R), green (G), blue (B), white (W), four colors repeatedly aligned along a row direction, and each row of pixel units employs the same manner to be circularly aligned, or alignments of all rows of pixel units are not exactly the same.

5. The liquid crystal display panel according to claim 4, wherein pixel alignments in every two adjacent rows of pixel units in the pixel unit array are different, and one row of pixel units employs a RGBW manner to be circularly aligned and the other row of pixel units employs a manner different from the RGBW manner to be circularly aligned.

6. The liquid crystal display panel according to claim 2, wherein the pixel unit array is formed with the pixel units of red (R), green (G), blue (B), white (W), four colors repeatedly aligned along a row direction, and each row of pixel units employs the same manner to be circularly aligned, or alignments of all rows of pixel units are not exactly the same.

7. A liquid crystal display device, wherein the liquid crystal display device comprises:
  a liquid crystal display panel, comprising:
  a plurality of data line pairs, each set of data line pair comprising a first data line and a second data line which are located side by side;
  a plurality of scan lines, comprising a first scan line and a second scan line which are perpendicular with the plurality of data line pairs and alternatively arranged; and
  a pixel unit array, comprising a plurality of pixel units, which are respectively located in regions formed by arrangement of the plurality of data line pairs and the plurality of scan lines, and each row of pixel units being coupled to a first scan line and a second scan line;
  a scan drive unit, employed to provide a scan drive signal to the first scan line and the second scan line; and
  a data drive unit, employed to provide a data drive signal to a first data line and a second data line;
  wherein a scan drive signal received by the first scan line and the second scan line scan the two rows of pixel units coupled to each other at the same time, and the first scan line and the second scan line are respectively coupled to at least two pixel units in a single row of the pixel unit, and drives the pixel units coupled to each data line in time division to charge the pixel units coupled to the same data line in time division;
  wherein the first data line and the second data line transmit data signals with positive polarity or negative polarity to the coupled pixel units, and the polarities of the entire column of the pixel unit array are inverted, and the pixel units are coupled to the first data line or the second data line which can provide corresponding polarity signals according to self polarities to make the first data line or the second data line be coupled to a plurality of pixel units of the same row at the same time; and
  wherein in the pixel unit, the polarities of the pixels of the entire column are reversed in order of positive, negative, negative, positive, negative, positive, positive, negative.

8. The liquid crystal display device according to claim 7, wherein the liquid crystal display device further comprises:
  a touch control module, embedded inside the liquid crystal display panel; and
  a sequence control unit, electrically coupled to the scan drive unit and the data drive unit, and employed to control the liquid crystal display panel realizing touch control function in a touch panel term and to control the display panel showing images in a display term.

9. The liquid crystal display device according to claim 7, wherein the first scan line and the second scan line are separated with a row of pixel units, and each of the first scan lines is arranged to be adjacent to one of the second scan lines.

10. The liquid crystal display device according to claim 7, wherein the first scan line and the second scan line are separated with k rows of pixel units, and k of the first scan lines are adjacent, and k of the second scan lines are adjacent, and $2 \leq k \leq n/2$ is satisfied, wherein n is a row number of the pixel unit array, and k and n are positive integers, and n is a positive integer larger than or equal to 4.

11. The liquid crystal display device according to claim 7, wherein the pixel unit array is formed with the pixel units of red (R), green (G), blue (B), white (W), four colors repeatedly aligned along a row direction, and each row of pixel units employs the same manner to be circularly aligned, or alignments of all rows of pixel units are not exactly the same.

12. The liquid crystal display device according to claim 11, wherein pixel alignments in every two adjacent rows of pixel units in the pixel unit array are different, and one row of pixel units employs a RGBW manner to be circularly aligned and the other row of pixel units employs a manner different from the RGBW manner to be circularly aligned.

13. The liquid crystal display device according to claim 8, wherein the pixel unit array is formed with the pixel units of red (R), green (G), blue (B), white (W), four colors repeatedly aligned along a row direction, and each row of pixel units employs the same manner to be circularly aligned, or alignments of all rows of pixel units are not exactly the same.

* * * * *